United States Patent
Itoh et al.

(10) Patent No.: US 7,112,377 B2
(45) Date of Patent: Sep. 26, 2006

(54) MAGNETIC RECORDING MEDIUM, METHOD OF MANUFACTURING THE SAME, MAGNETIC MEDIUM SUBSTRATE EMPLOYED IN THE MAGNETIC RECORDING MEDIUM, AND MAGNETIC STORAGE UNIT

(75) Inventors: Ken-ichi Itoh, Kawasaki (JP); Tsugio Kumai, Kawasaki (JP); Shintaro Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/042,332

(22) Filed: Jan. 26, 2005

(65) Prior Publication Data

US 2005/0196644 A1    Sep. 8, 2005

Related U.S. Application Data

(63) Continuation of application No. PCT/JP03/01263, filed on Feb. 6, 2003.

(51) Int. Cl.
*G11B 5/39*    (2006.01)
*G11B 5/71*    (2006.01)

(52) U.S. Cl. ............... 428/831.2; 428/846.4; 428/848.8; 216/36; 360/135

(58) Field of Classification Search ........... 428/832, 428/833.2, 846.7, 847.6, 848.8, 611, 640, 428/650, 304.4, 900, 307.7, 692.1, 846.4, 428/332.4, 848.2, 831.2, 836; 439/87; 360/134, 360/135, 136; 369/283, 286; 313/311, 51; 205/119; 257/314, 279, 276, 671, 3, 774; 216/56

See application file for complete search history.

(56) References Cited

U.S. PATENT DOCUMENTS

| | | | | |
|---|---|---|---|---|
| 5,315,206 A | * | 5/1994 | Yoshida | 313/351 |
| 5,358,417 A | * | 10/1994 | Schmedding | 439/87 |
| 6,325,909 B1 | * | 12/2001 | Li et al. | 205/119 |
| 6,472,814 B1 | * | 10/2002 | Yamanobe et al. | 313/311 |
| 6,566,704 B1 | * | 5/2003 | Choi et al. | 257/314 |
| 6,858,319 B1 | * | 2/2005 | Yasui et al. | 428/846.4 |
| 6,937,447 B1 | * | 8/2005 | Okuno et al. | 428/678 |

FOREIGN PATENT DOCUMENTS

| | | |
|---|---|---|
| JP | 60-82694 | 5/1985 |
| JP | 61-42721 | 3/1986 |
| JP | 64-13216 | 1/1989 |
| JP | 1-211213 | 8/1989 |
| JP | 2-143914 | 6/1990 |
| JP | 2-223008 | 9/1990 |
| JP | 6-227806 | 8/1994 |

(Continued)

OTHER PUBLICATIONS

Translation JP 2000-314714.*

(Continued)

*Primary Examiner*—Carol Chaney
*Assistant Examiner*—Louis de Falasco
(74) *Attorney, Agent, or Firm*—Westerman, Hattori, Daniels & Adrian, LLP.

(57) ABSTRACT

A magnetic recording medium is disclosed that includes a substrate; an anodic alumina film formed on the substrate; a pore formed in the anodic alumina film; a carbon layer covering the surface of the anodic alumina film and the inner wall of the pore; a magnetic particle formed on the carbon layer inside the pore; and a lubrication layer covering the carbon layer and the magnetic particle.

12 Claims, 9 Drawing Sheets

FOREIGN PATENT DOCUMENTS

| | | |
|---|---|---|
| JP | 10-320772 | 12/1998 |
| JP | 2000-48340 | 2/2000 |
| JP | 2000-54012 | 2/2000 |
| JP | 2000-314714 | * 11/2000 |
| JP | 2000-315785 | 11/2000 |
| JP | 2002-175621 | 6/2002 |
| JP | 2002-332578 | 11/2002 |
| JP | 2003-129288 | 5/2003 |

OTHER PUBLICATIONS

P.P. Mardilovich et al., *New and modified anodic alumina membranes . . . Science*, Journal of Membrane Science 98, pp. 143-155 (1995).

Sun et al., *Monodisperse FePt Nanoparticles and Ferromagnetic . . .*, Science, vol. 287, No. 17, pp. 1989-1992 (2000).

* cited by examiner

| | 0.1mol/L HCl SOLUTION | | 0.1mol/L NaOH SOLUTION | |
| --- | --- | --- | --- | --- |
| | 24 HOURS LATER | 500 HOURS LATER | 2 HOURS LATER | |
| FIRST IMPLEMENTATION | 0 | 0 | 0 | |
| SECOND IMPLEMENTATION | 0 | 0 | 0 | |
| THIRD IMPLEMENTATION | 0 | 0 | 0 | |
| COMPARATIVE EXAMPLE | 5mmol/L Al/g | 15mmol/L Al/g | 15mmol/L Al/g | |

FIG.10

| SAMPLE | LUBRICANT | | |
|---|---|---|---|
| | Z25 | ZDol | AM3001 |
| FIRST IMPLEMENTATION | DAMAGE CAUSED AT 120,000 PASSES | DAMAGE CAUSED AT 100,000 PASSES | NO DAMAGE AT 300,000 PASSES |
| SECOND IMPLEMENTATION | DAMAGE CAUSED AT 100,000 PASSES | DAMAGE CAUSED AT 180,000 PASSES | NO DAMAGE AT 300,000 PASSES |
| THIRD IMPLEMENTATION | DAMAGE CAUSED AT 80,000 PASSES | DAMAGE CAUSED AT 120,000 PASSES | NO DAMAGE AT 300,000 PASSES |
| COMPARATIVE EXAMPLE | DAMAGE CAUSED AT 20,000 PASSES | DAMAGE CAUSED AT 20,000 PASSES | DAMAGE CAUSED AT 50,000 PASSES |

MAGNETIC RECORDING MEDIUM, METHOD OF MANUFACTURING THE SAME, MAGNETIC MEDIUM SUBSTRATE EMPLOYED IN THE MAGNETIC RECORDING MEDIUM, AND MAGNETIC STORAGE UNIT

CROSS-REFERENCE TO RELATED APPLICATION

This application is a U.S. continuation application filed under 35 U.S.C. 111(a) claiming benefit under 35 U.S.C. 120 and 365(c) of PCT International Application No. PCT/JP03/01263, filed Feb. 6, 2003, the entire contents of which are hereby incorporated by reference.

BACKGROUND OF THE INVENTION

1. Field of the Invention

The present invention relates to magnetic recording media, methods of manufacturing the same, magnetic medium substrates employed in the magnetic recording media, and magnetic storage units, and particularly to a magnetic medium substrate in which a carbon layer is formed on the surface of a pore of an anodic alumina film on a non-magnetic substrate, and a magnetic recording medium using the magnetic medium substrate, making it possible to increase capacity, increase speed, reduce cost, and ensure reliability.

There is a growing need for capacity increase, higher speed, and lower cost with respect to a recording medium used in external magnetic storage units for computers and household video storage devices due to a rapid increase in the amount of information stored therein. The principal emphasis for satisfying such a need is to increase the recording density of the magnetic recording medium. The conventionally mainstream in-plane recording method using a continuous magnetic film is approaching a technological limit on reaching a recording density of 100 Gbit/in$^2$ because of a problem in that with an increase in recording density, signal-to-noise ratio decreases because of an increase in transition noise and the thermal stability of recorded magnetization decreases.

2. Description of the Related Art

Figure 1:
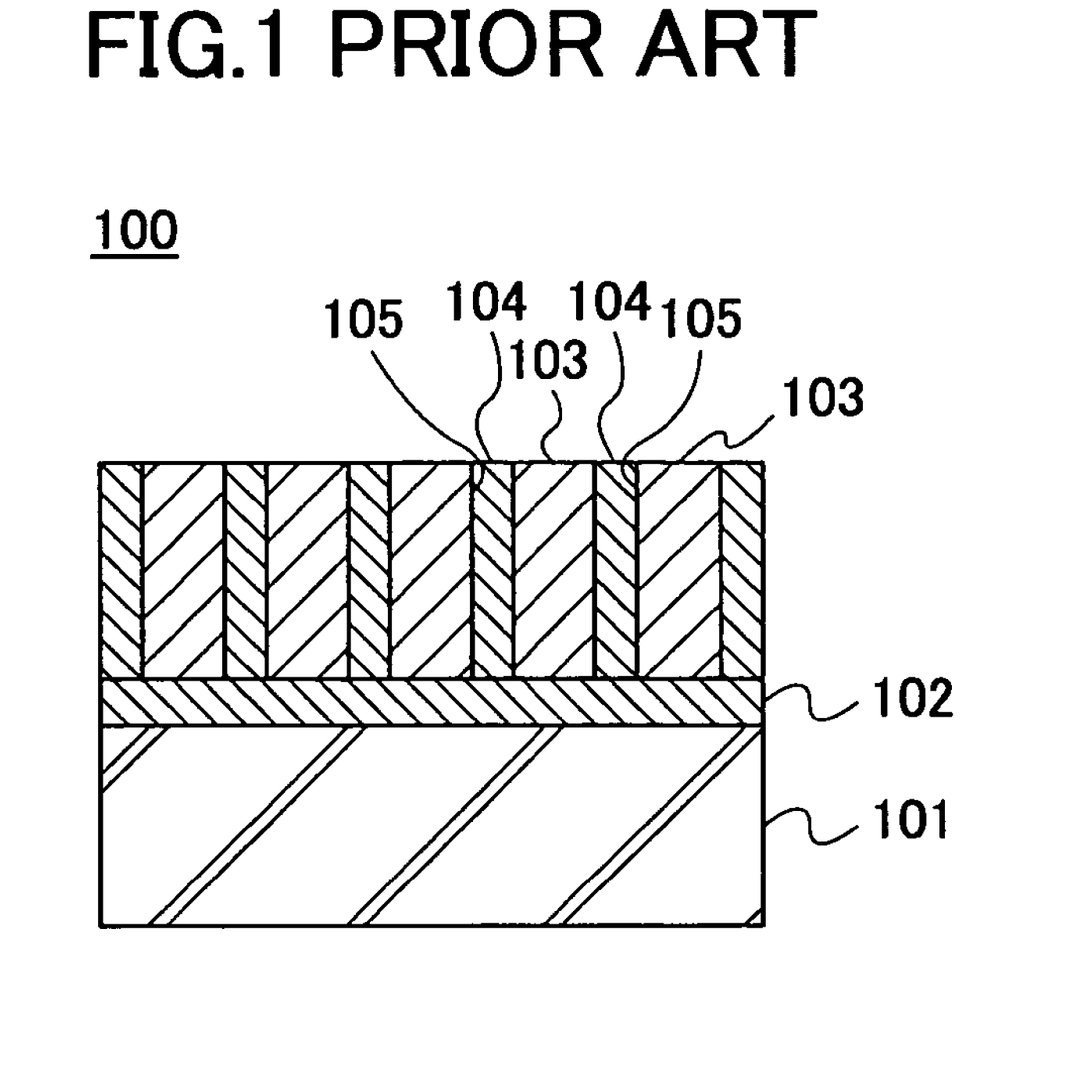
FIG. 1 is a sectional view of a conventional magnetic recording medium using an anodic alumina film.

In order to reduce transition noise, a patterned medium in which minute magnetic particles are wrapped in a non-magnetic film and arranged regularly has been actively studied as a new type of magnetic recording medium. In the patterned medium, the exchange interaction and the magnetostatic interaction between magnetic particles are interrupted by the non-magnetic film between the magnetic particles. Accordingly, it is possible to reduce transition noise. Further, the perpendicular recording method has attracted attention again as a method that can achieve recording densities higher than 1 Tbit/in$^2$. As patterned media, those in which magnetic particles are self-organized and arranged (see Sun et al., Science, vol. 287, No. 17, pp. 1989 (2000), Japanese Laid-Open Patent Application No. 2000-48340, and Japanese Laid-Open Patent Application No. 2000-54012) and those using regular pores formed in an anodic alumina film have been presented. FIG. 1 is a sectional view of a conventional magnetic recording medium using an anodic alumina film. As shown in FIG. 1, a magnetic recording medium 100 is formed by filling pores 105 formed in an anodic alumina film 103 formed on a lower electrode layer 102 on a substrate 101 with a magnetic material 104 (see Japanese Laid-Open Patent Application No. 2002-175621). The anodic alumina film 103 can be obtained by anodizing an aluminum film in an oxalic acid aqueous solution. In doing so, the aluminum film is converted into an alumina film, and a pore is formed in the center of a hexagonal cell. The hexagonal cells are formed regularly. Therefore, it is expected that by filling the pores with a magnetic material, magnetic particles are arranged regularly and the exchange interaction and the magnetostatic interaction between the magnetic particles are interrupted by the alumina film, which is a non-magnetic film, thereby making it possible to greatly reduce transition noise.

By the way, in order to realize a highly reliable magnetic recording medium, high performance is required in terms of the tribology and the chemical stability of a magnetic head and the surface of the magnetic recording medium, for instance, the durability of the surface of the magnetic recording medium with respect to the sliding of the magnetic head and the corrosion resistance thereof to acids or alkalis resulting from a variety of contaminants.

For instance, the above-described magnetic recording medium 100 using the anodic alumina film 103 has a problem in terms of corrosion resistance. That is, the anodic alumina film is an amorphous alumina film, and is converted into a polycrystalline alumina film by heat treatment at temperatures higher than or equal to 850° C. The polycrystalline alumina film is stable with respect to acid or alkali, while it has been reported that the amorphous alumina film is gradually or rapidly dissolved by acids having a pH of 4.2 or lower or alkalis having a pH of 9.9 or higher (see P. P. Mardilovich et al., J. Membrane Science, 98, (1995) 143). A magnetic storage unit that contains a magnetic recording medium may be internally contaminated by various chemical substances in air or in the magnetic storage unit as impurity gases or liquid droplets, which may adhere to and corrode the magnetic recording medium. If corrosion occurs, the surface of the magnetic recording medium becomes uneven so that a magnetic head that floats as low as tens of nanometers above the surface of the magnetic recording medium suffers a head crash.

In light of the sliding of the magnetic head, normally, a lubricant having a main chain of perfluoropolyether is applied to reduce the coefficient of friction, and it functions as a cushioning material when the magnetic head comes into contact with the magnetic recording medium. In particular, the lubricant is scattered or dissolved and vaporized by the sliding of the magnetic head against the magnetic recording medium. Accordingly, in order to ensure long-time durability, it is important to store the lubricant sufficiently on the surface of the magnetic recording medium. However, the lubricant is prevented from being stored sufficiently on the above-described magnetic recording medium using the anodic alumina film because its surface is alumina oxide or metal. In general, in dealing with this, a protection layer of an amorphous carbon film or a DLC film is formed on the surface. However, mere provision of the protection layer does not provide sufficient durability against sliding.

SUMMARY OF THE INVENTION

Accordingly, it is a general object of the present invention to provide a novel and useful magnetic recording medium in which the above-described disadvantages are eliminated, a method of manufacturing the same, a magnetic medium substrate employed in the magnetic recording medium, and a magnetic storage unit.

A more specific object of the present invention is to provide a magnetic recording medium that satisfies both corrosion resistance and durability and enables high-density recording, a method of manufacturing the same, a magnetic medium substrate employed in the magnetic recording medium, and a magnetic storage unit.

The above objects of the present invention are achieved by a magnetic recording medium including a substrate; an anodic alumina film formed on the substrate; a pore formed in the anodic alumina film; a carbon layer covering a surface of the anodic alumina film and an inner wall of the pore; a magnetic particle formed on the carbon layer inside the pore; and a lubrication layer covering the carbon layer and the magnetic particle.

According one aspect of the present invention, a carbon layer is formed on the surface of an anodic alumina film and the inner wall of each pore formed therein. The anodic alumina film, which is an amorphous alumina film, is chemically unstable. However, since the anodic alumina film is covered with and protected by the carbon layer, good corrosion resistance is provided. Further, it is inferred that the carbon layer has the function of storing lubricant that forms a lubrication layer. Accordingly, since it is possible to supplement the lubricant lost by sliding contact with a magnetic head, good durability can be provided. Further, the pores, which are regularly separated and formed, are filled with magnetic particles formed of a magnetic material. Therefore, variations in the magnitude of the exchange interaction and the magnetostatic interaction between the magnetic particles are reduced, or the interactions are interrupted. Accordingly, it is possible to reduce an increase in medium noise due to high-density recording, thus making it possible to perform high-density recording.

The above objects of the present invention are also achieved by a method of manufacturing a magnetic recording medium, including the steps of (a) forming an aluminum film on a substrate; (b) converting the aluminum film into an anodic alumina film by anodic oxidation and forming a pore therein; (c) forming a carbon layer on a surface of the anodic alumina film and an inner wall of the pore; (d) filling the pore with a magnetic material; and (e) forming a lubrication layer.

According to one aspect of the present invention, a carbon layer is formed on the surface of an anodic alumina film and the inner wall of each pore formed therein, thereby protecting the anodic alumina film. Accordingly, a magnetic recording medium that excels in corrosion resistance can be realized. Further, since the pores are formed by anodic oxidation, it is possible to obtain pores that are regularly arranged. Accordingly, variations in the magnitude of the exchange interaction and the magnetostatic interaction between magnetic particles formed in the pores are reduced, or the interactions are interrupted. Accordingly, it is possible to realize a magnetic recording medium that enables high-density recording.

The above objects of the present invention are also achieved by a magnetic medium substrate including a substrate; an anodic alumina film formed on the substrate; a pore formed in the anodic alumina film; and a carbon layer covering a surface of the anodic alumina film and an inner wall of the pore.

According to one aspect of the present invention, a carbon layer is formed on the surface of an anodic alumina film including the inner wall of each of pores regularly formed therein. Since the entire surface of the anodic alumina film is protected by the carbon layer, good corrosion resistance is provided. Further, since the pores are regularly formed, variations in the magnitude of the interactions between magnetic particles formed in the pores are reduced, or the interconnections are interrupted. Accordingly, the magnetic medium substrate of the present invention is suitable for a magnetic recording medium for high-density recording.

The above objects of the present invention are also achieved by a magnetic storage unit including a magnetic head including a magnetoresistive reproduction head; and the magnetic recording medium of the present invention.

According to one aspect of the present invention, the magnetic recording medium of the present invention excels in corrosion resistance and durability and also enables high-density recording. Accordingly, by combining the magnetic recording medium with a magnetoresistive reproduction head, it is possible to realize high-density recording.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A detailed description is given below, with reference to the accompanying drawings, of embodiments of the present invention.

First Embodiment

Figure 2A:
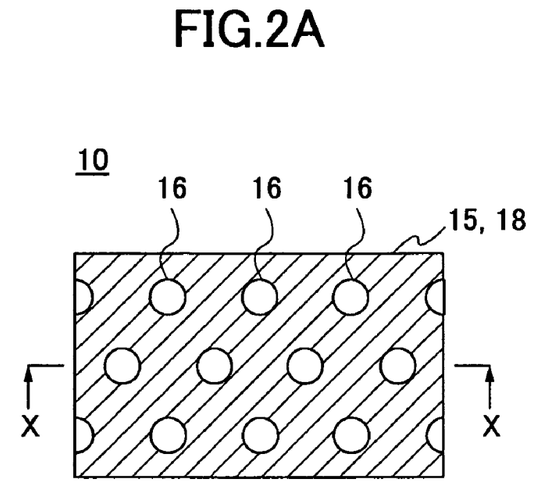
FIG. 2A is a top plan view of a magnetic recording medium according to a first embodiment of the present invention.
Figure 2B:
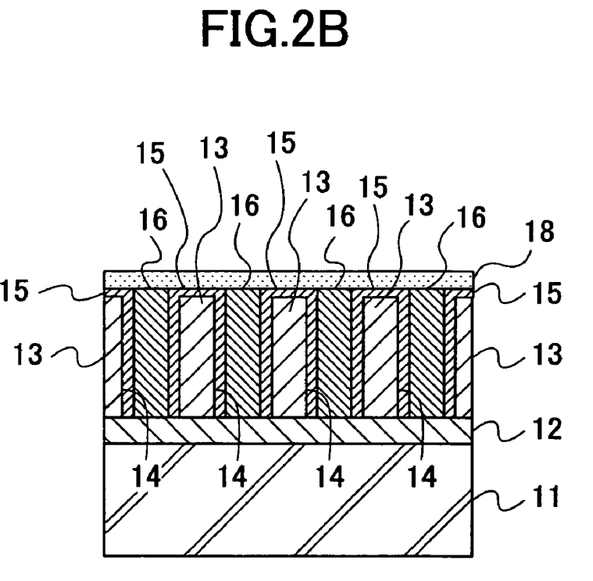
FIG. 2B is a sectional view of the magnetic recording medium taken along the line X—X shown in FIG. 2A according to the first embodiment of the present invention.

FIG. 2A is a top plan view of a magnetic recording medium 10 according to a first embodiment of the present invention. FIG. 2B is a sectional view of the magnetic recording medium 10 taken along the line X—X shown in FIG. 2A. Referring to FIGS. 2A and 2B, the magnetic recording medium 10 of this embodiment includes a substrate 11, a lower electrode layer 12 formed on the substrate 11, an anodic alumina film 13 formed on the lower electrode layer 12, a carbon layer 15 formed on the surface of the anodic alumina film 13 and the inner walls of pores 14, and a lubrication layer 18 formed to cover the carbon layer 15 and magnetic particles 16. In FIG. 2A, the lubrication layer 18 is formed entirely over the carbon layer 15 and the magnetic particles 16.

Figure 3:
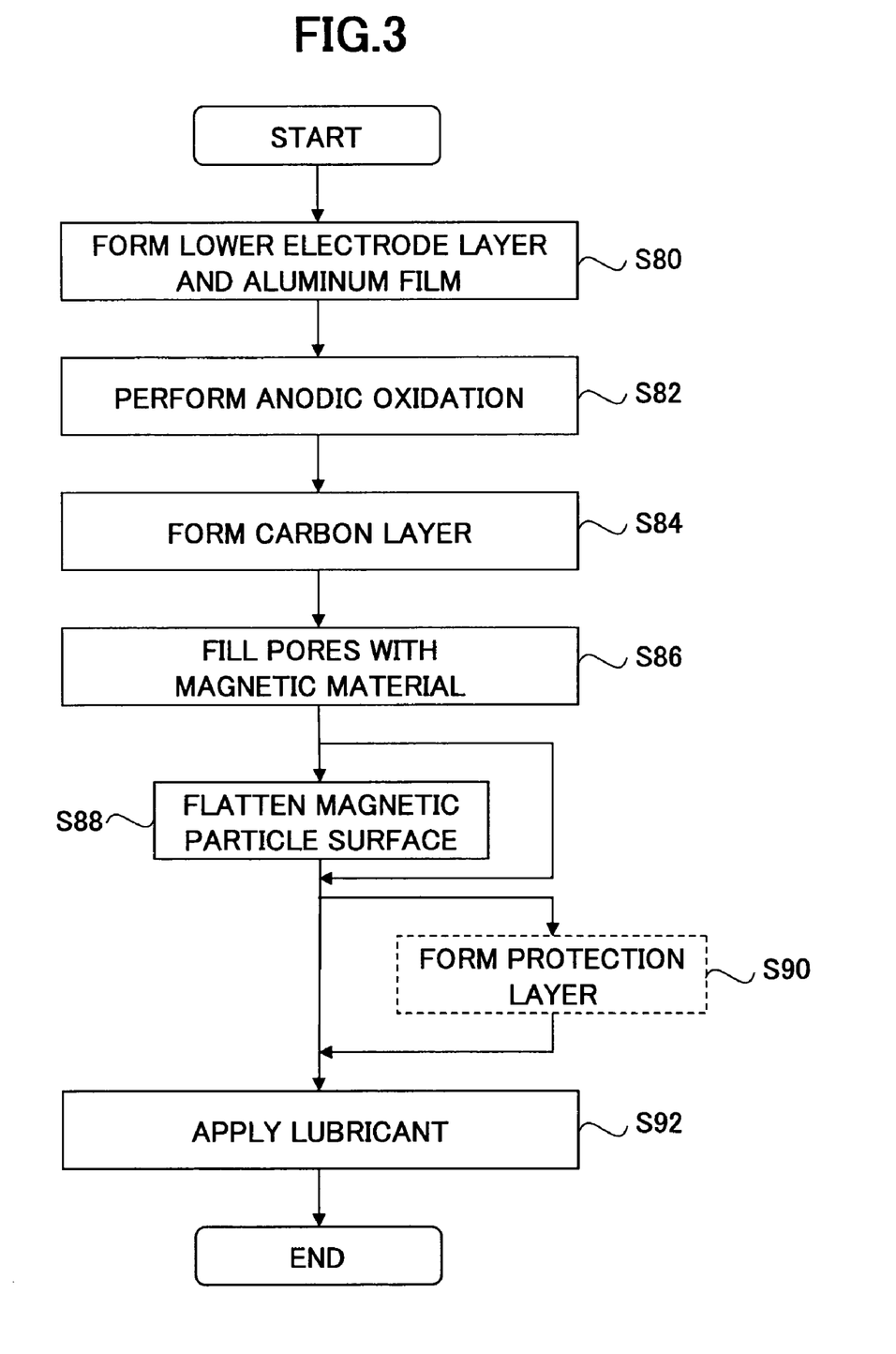
FIG. 3 is a flowchart showing a manufacturing process of the magnetic recording medium according to the first embodiment of the present invention.

A detailed description is given below, with reference to the flowchart of FIG. 3, of the magnetic recording medium 10 of this embodiment and its manufacturing method. FIG. 3 shows a manufacturing process of the magnetic recording medium 10.

The substrate 11 of the magnetic recording medium 10 of this embodiment may employ, for instance, a disk-like plastic substrate, glass substrate, NiP-plated aluminum alloy substrate, or silicon substrate. In particular, when the substrate 11 is tapelike, it is possible to employ a plastic film of PET, PEN, or polyimide. In light of heat resistance, the substrate 11 is preferably a glass substrate, a silicon substrate, or polyimide. The silicon substrate is particularly preferable, considering that the substrate 11 is heated to approximately 600° C. to 800° C. in the below-described process of forming the carbon layer with a thermal decomposition CVD apparatus using an electric furnace.

First, in step S80, the lower electrode layer 12 of 20 nm in thickness and an aluminum film of 50 nm in thickness are formed on the substrate 11 by vapor deposition, sputtering, or CVD. The lower electrode layer 12, which is formed of a conductive metal or alloy, serves as a base layer for growing an anode and the magnetic particles 16 in performing anodic oxidation. If the substrate 11 is, for instance, a NiP-plated aluminum alloy substrate, the lower electrode layer 12 may be omitted because the substrate 11 itself is conductive.

The aluminum film formed on the lower electrode layer 12 is 20 nm to 500 nm in thickness, and may be formed by vapor deposition, sputtering, or CVD. The thickness of the aluminum film is determined in view of the depth of the below-described pores 14, that is, the thickness (length) of the magnetic particles 16 filling the pores 14.

Next, in step S82, the aluminum film is converted into the anodic alumina film 13 by anodic oxidation, and the pores 14 are formed. In anodic oxidation of the aluminum film, voltage is applied in a sulfuric acid bath, a phosphoric acid bath, or an oxalic acid bath using the lower electrode layer 12 as an anode and a carbon or platinum electrode as a cathode. By employing anodic oxidation, the pores 14 reaching the lower electrode layer 12 from the surface of the anodic alumina film 13 can be formed at the same time that the aluminum film is converted into the anodic alumina film 13 formed of amorphous alumina. Accordingly, the depth of the pores 14, that is, the thickness of the magnetic particles 16, to be filled and formed later, can be set by the thickness of the aluminum film. The pores 14 can be formed even with a high aspect ratio. Further, since the pores 14 do not couple with each other, it is possible to ensure that the magnetic particles 16 are formed isolated from each other.

The distance between the pores 14 may be controlled by providing recesses serving as starting points from which the pores 14 are formed on the surface of the alumina layer by photolithography and etching or stamping prior to anodic oxidation. Further, the distance between the pores 14 may also be controlled by two-step anodic oxidation, that is, a method that forms recesses serving as starting points by applying voltage that determines the distance between pores in a first anodic oxidation step, and forms the pores at the recesses by applying the same voltage as in the first step in a second anodic oxidation step.

The distance between the pores 14 determines the distance between the magnetic particles 16, and the distance between the magnetic particles 16 relates directly to the magnitude and the distribution of magnitude of the exchange interaction and the magnetostatic interaction between the magnetic particles 16. From this point of view, the distance between the pores 14, that is, the distance between the centers of each adjacent two of the pores 14, is preferably greater than or equal to the diameter of the pores 14 plus 2 nm, and is less than or equal to the diameter of the pores 14 plus 50 nm. If it is greater than the diameter of the pores 14 plus 50 nm, the density of the magnetic particles 16 retaining a unit of information is reduced, so that recording density is significantly reduced.

As a method of increasing the diameter of the pores 14, wet etching may be performed in a phosphoric acid solution after anodic oxidation, or isotropic dry etching may also be employed. In dry etching, $CCl_4$ gas, for instance, may be employed as a process gas. The diameter of the pores 14 is increased if necessary, and the diameter of the pores 14 at the time of forming the carbon layer 15 next is set to, for instance, 10–100 nm.

Next, in step S84, the carbon layer 15 is formed on the surface of the anodic alumina film 13 in which the pores 14 are formed and on the inner walls of the pores 14. The carbon layer 15 is set to several to tens of layers (thickness per layer is 0.335 nm) in thickness, and is formed of five-membered rings and six-membered rings. For instance, a sheet-like carbon layer of six-membered rings is cylindrically formed on the inner walls of the pores 14. A sheet-like carbon layer of six-membered rings is also formed on the surface of the anodic alumina film 13. Further, these carbon layers are connected by a carbon layer including five-membered rings at the boundary between the pores 14 and the upper surface, that is, a shoulder part. Thus, the entire surface of the anodic alumina film 13 is covered with the carbon layer 15. Accordingly, various chemical substances that may adhere to the surface of the magnetic recording medium 10, for instance, acids or alkalis, are prevented from coming into direct contact with the anodic alumina film 13. The carbon layer 15, which is not eroded by acid or alkali, has good corrosion resistance itself.

In the sheet-like carbon layers of six-membered rings formed on the anodic alumina film 13, the crystallinity of six-membered structure is not always complete, and so-called crystal defects exist. It is inferred that the crystal defects serve as active sites, making it easy to bond to the end active sites of a lubricant. Further, it is inferred that the five-membered rings also have active sites so that the end active sites, for instance, polar groups, of the lubricant forming the lubrication layer 18 bond to these carbon layers, thereby making the bonding of the lubricant firmer so as to make the lubricant less susceptible to spin-off. Further, it is inferred that the existence of the active sites of these carbon layers causes the lubricant to be more storable.

As a specific method of forming the carbon layer 15, hydrocarbon gas and nitrogen or hydrogen gas are employed as process gases by chemical vapor deposition (CVD), and are dissociated by thermal decomposition or a plasma so that carbon is caused to react on the surface of the anodic alumina film 13.

Hydrocarbon gases employed in CVD are preferably gases consisting of saturated hydrocarbons or unsaturated hydrocarbons of one to four carbon atoms because of their susceptibility to thermal decomposition. Of these, saturated hydrocarbons such as methane ($CH_4$), ethane ($C_2H_6$) propane ($C_3H_8$), and butane ($C_4H_{10}$) or unsaturated hydrocarbons such as ethylene ($C_2H_4$), propylene ($C_3H_6$), butylene ($C_4H_8$), and acetylene ($C_2H_2$) are particularly preferable.

Suitable examples of apparatuses for CVD for carbon layer formation include a thermal decomposition CVD apparatus using an electric furnace, a thermal decomposition CVD apparatus using a hot filament, and a microwave plasma apparatus.

Figure 4:
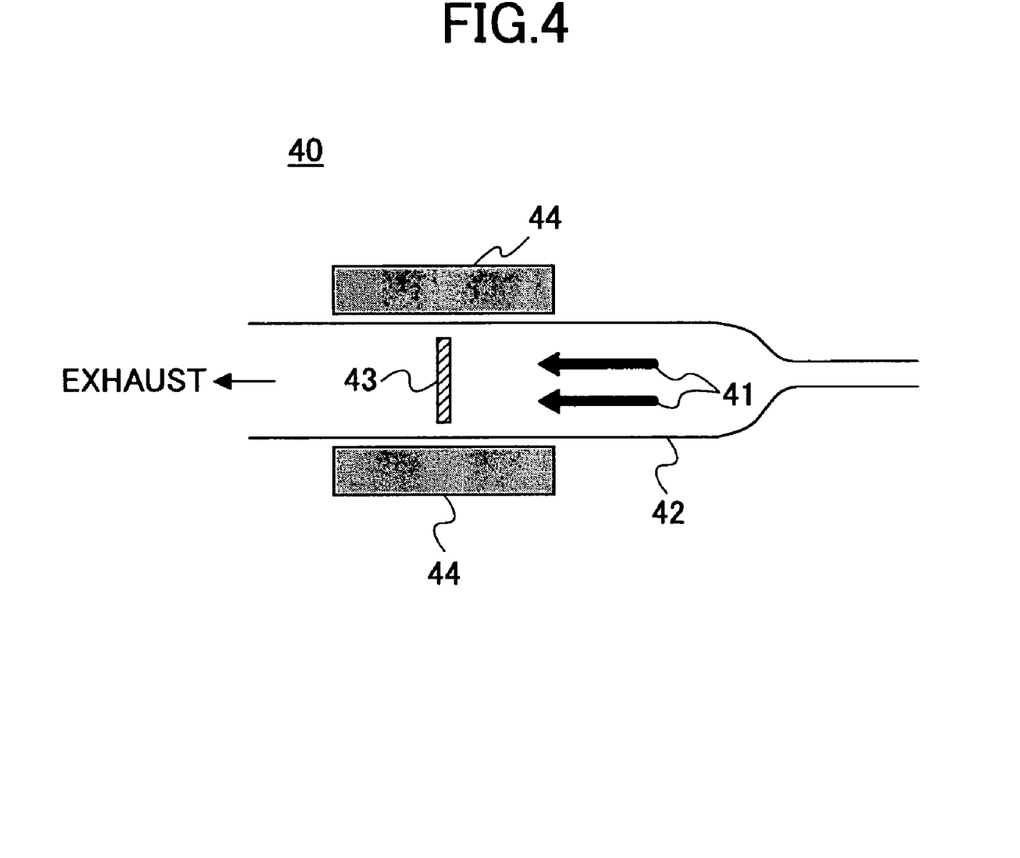
FIG. 4 is a diagram showing the concept of a thermal decomposition CVD apparatus using an electric furnace according to the first embodiment of the present invention.

FIG. 4 is a diagram showing the concept of a thermal decomposition CVD apparatus using an electric furnace. Referring to FIG. 4, a thermal decomposition CVD apparatus 40 using an electric furnace includes a quartz tube 42 through which process gases flow, and an electric furnace 44 for heating a multilayer body 43 (formed of the substrate 11 with the lower electrode layer 12 and the anodic alumina film 13 deposited thereon of FIG. 2B). The multilayer body 43, in which the anodic alumina film 13 having the pores 14 is formed, is heated to 600° C. to 1000° C., preferably 800° C., using the electric furnace 44, and for instance, propylene, which is a hydrocarbon gas, and nitrogen gas are caused to flow. By setting the ratio of flow rate of the propylene gas to the nitrogen gas to 1–5%, preferably 2.5%, a carbon layer is formed in the pores and on the upper surface of the anodic alumina film of the multilayer body 43 in the thermal decomposition CVD apparatus 40. At this point, a silicon substrate is suitable as the substrate of the multilayer body 43 in terms of heat resistance.

Figure 5:
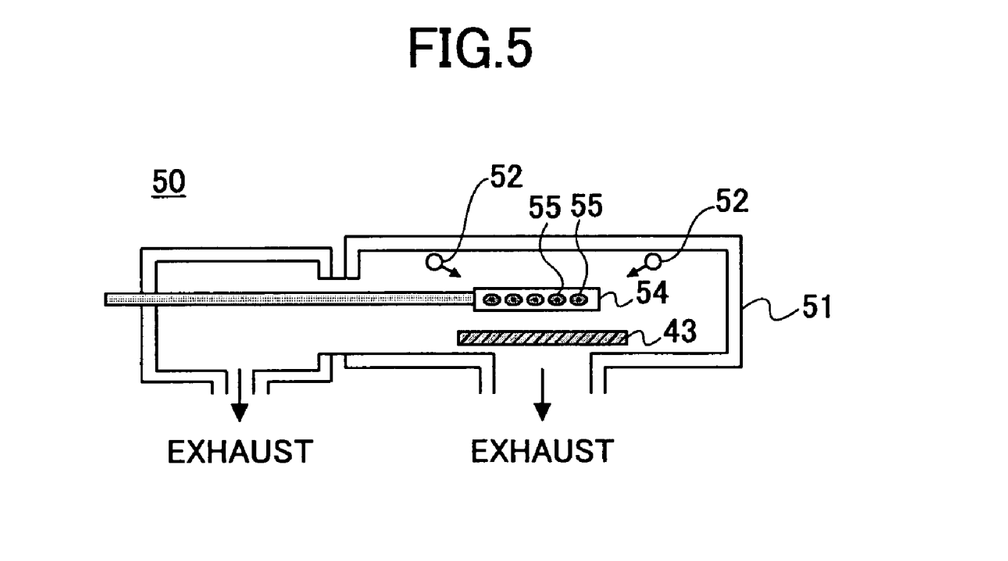
FIG. 5 is a diagram showing the concept of a hot filament thermal decomposition CVD apparatus according to the first embodiment of the present invention.

FIG. 5 is a diagram showing the concept of a hot filament CVD apparatus. Referring to FIG. 5, a hot filament CVD apparatus 50 includes a process chamber 51 realizing a reduced pressure condition, gas introduction heads 52 through which a material gas is introduced, and hot filaments 55 fixed to a holder 54 and generating heat between the multilayer body 43 and the gas introduction heads 52. The filaments 55 are energized to high temperatures of 1500° C. to 2300° C., and hydrocarbon gas and hydrogen gas, which is a carrier gas, are introduced from the gas introduction heads 52 to be brought into contact with the filaments 55, so that the hydrocarbon gas is subjected to thermal decomposition. Then, a product generated thereby is deposited on the surface of the multilayer body 43. The filaments 55 are formed of a refractory metal such as tungsten or rhenium. The filaments 55 are preferably formed of rhenium because it allows heating to higher temperatures. As conditions for forming a carbon layer, preferably, the filaments 55 are set to 1900° C.; acetylene, for instance, is employed as the hydrocarbon gas and the gas pressure is set to 2–5 Pa, preferably 3 Pa; and the pressure of all gases including hydrogen is set to 20–50 Pa, preferably 30 Pa. Thereby, a carbon layer is formed in the pores 14 and on the upper surface of the anodic alumina film 13 of the multilayer body 43.

Thus, by employing a hot filament CVD apparatus, the temperature of the multilayer body 43 can be lower than in the case of employing the above-described thermal decomposition CVD apparatus 40. Accordingly, this is preferable in that thermal influence on the substrate 11, the lower electrode layer 12, and the anodic alumina film 13 of the multilayer body 43 can be reduced and accordingly, the range of substrate material options can be expanded.

Figure 6:
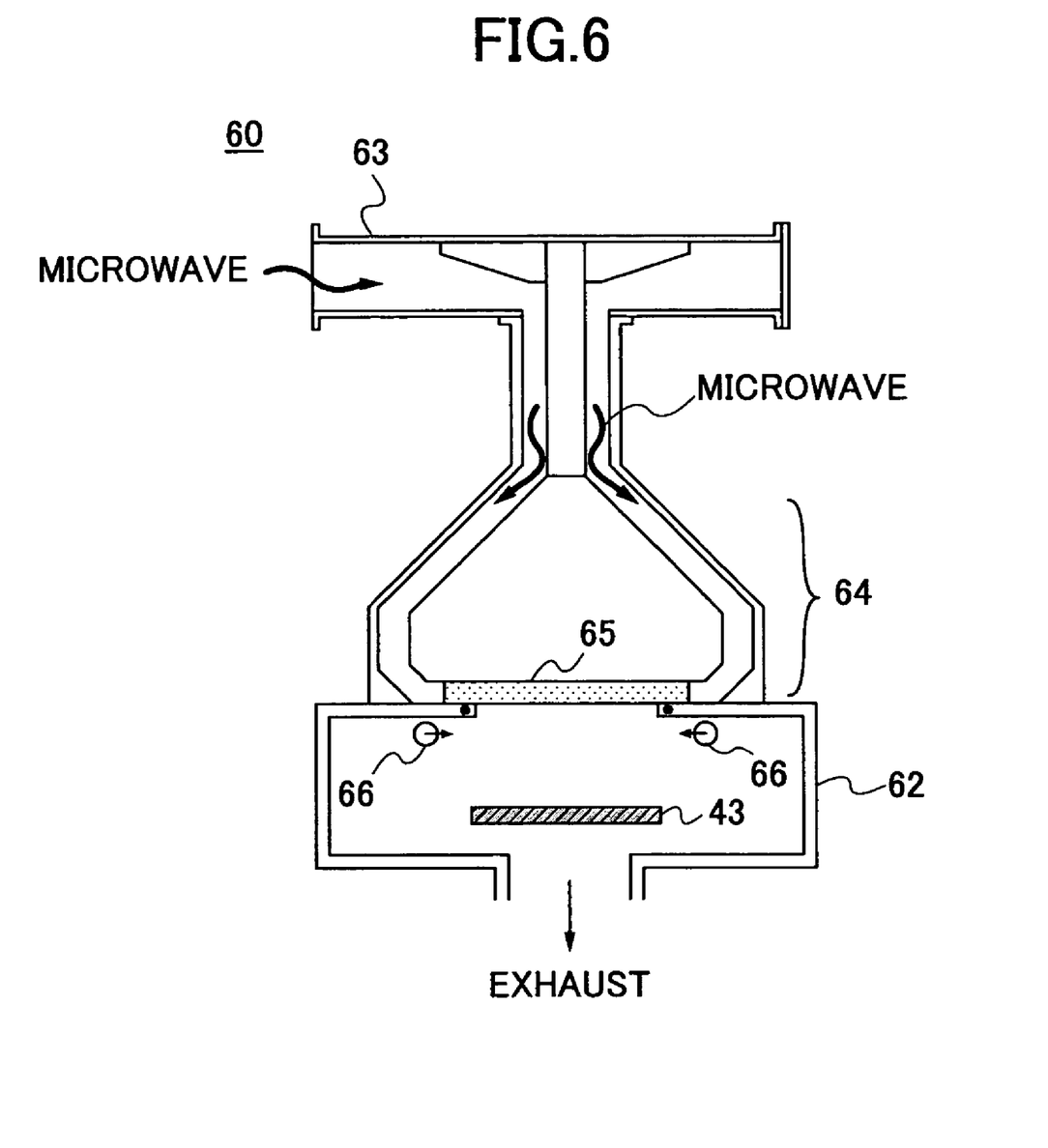
FIG. 6 is a diagram showing the concept of a microwave plasma CVD apparatus according to the first embodiment of the present invention.

FIG. 6 is a diagram showing the concept of a microwave plasma CVD apparatus. Referring to FIG. 6, a plasma CVD apparatus 60 includes a process chamber 62 having the multilayer body 43 placed therein and realizing a reduced pressure condition, a waveguide tube 63 connected to a microwave source (not graphically illustrated) to introduce microwaves, a microwave antenna 64, a quartz glass plate 65 to introduce microwaves into the processing chamber, and gas introduction heads 66. Hydrocarbon gas and nitrogen gas, which is a carrier gas, are introduced from the gas introduction heads 66. Plasma is formed below the quartz glass plate 65 by a microwave discharge, and carbon radicals generated by dissociation are deposited on the multilayer body 43. Thereby, a carbon layer is formed in the pores 14 and on the upper surface of the anodic alumina film 13.

For instance, the processing is performed for 5 min. to 30 min. with an RF frequency of 2.45 GHz; an RF power level of 0.5 kW to 6 kW; a gas mixture of methane gas, which is a material gas, and hydrogen gas, which is a carrier gas, being supplied with a flow rate ratio of 40/60 sccm to 20/80 sccm; gas pressure being set to 133 Pa to 532 Pa (1 Torr to 4 Torr), preferably 266 Pa to 399 Pa (2 Torr to 3 Torr); and the temperature of the multilayer body 43 being set to 300° C. to 500° C., preferably 400° C.

The inventors of the present invention have discovered that the performance of adhesion and coating of the above-described carbon layer and anodic alumina film is extremely high. As is apparent in below-described implementations, since the performance of adhesion and coating is extremely high, a significant improvement can be made in corrosion resistance against acid or alkali by protecting the anodic alumina film 13 formed of amorphous alumina with the carbon layer. Further, since the carbon layer is also formed on the upper surface of the anodic alumina film 13, extremely high durability is provided against the sliding of a magnetic head because of the adhesion between the carbon layer and the anodic alumina film 13, and the storability of a lubricant.

Referring back to FIGS. 2A, 2B, and 3, next, in step S86, the pores 14 with the inner walls of the carbon layer 15 are filled with a magnetic material, so that the magnetic particles 16 are formed. Specifically, sputtering, vapor deposition, or plating may be employed. In the case of a high aspect ratio, plating is suitable in terms of filling performance. It is possible to grow the magnetic particles 16 from the surface of the lower electrode layer 12 at the bottom of the pores 14 by plating such as electroplating or electroless plating.

For instance, in the case of forming a perpendicular recording medium by electroplating using a Co layer or a Co alloy layer for the magnetic particles 16, the magnetocrystalline easy axis of the magnetic particles 16 is formed to be perpendicular to the surface of the substrate 11. For instance, in order to orient the c-axis of the Co layer in a direction perpendicular to the substrate, any of fcc structure materials (111)-oriented in the direction perpendicular to the substrate surface, for instance, platinum group elements such as Pt, Ru, Rh, Pd, Os, Ir, and their alloys, is employed for the lower electrode layer 12. These elements or alloys have a self-orientation characteristic to be (111)-oriented in the direction perpendicular to the substrate surface. Accordingly, the (111) orientation can be formed easily. A base layer may be formed of the same material on the lower electrode layer 12, and the c-axis of the Co layer may be oriented in the direction perpendicular to the substrate by the base layer. The base layer may be formed by the same method as the lower electrode layer 12 after the lower electrode layer 12 is formed. The thickness of the base layer is set to, for instance, 10 nm to 100 nm.

In the magnetic particles 16, Ni, W, Re, Mn, P or the like may be added to Co so as to reduce the saturation magnetization of Co. Medium noise in recording and reproduction can be reduced while maintaining the c-axis orientation perpendicular to the substrate surface. As a plating liquid for forming the magnetic particles 16, a well-known plating liquid may be employed, such as an aqueous solution of a 0.2 M cobalt sulfate (II) 7 hydrate and 0.3 M boric acid (in the case of forming magnetic particles of Co) or an aqueous solution formed by further adding a nickel sulfate (II) 7 hydrate thereto (in the case of forming magnetic particles of CoNi).

Further, in light of improving recording density, the thickness of the magnetic particles 16 is reduced. That is, the magnetic particles 16 are formed into a thin film in order to reduce PW50 (the half width of a reproduced solitary wave) and ensure overwrite characteristics. For instance, the thickness of the magnetic particles 16 is preferably 5 nm to 20 nm in in-plane recording media, and 5 nm to 50 nm in perpendicular recording media.

In this case, the pores 14 have a low aspect ratio. Accordingly, the magnetic particles 16 may be formed by depositing a magnetic material on the carbon layer 15 inside the pores 14 using sputtering or vapor deposition. In order to form an in-plane recording medium, Cr or CrMo is employed for the lower electrode layer 12 and a ferromagnetic CoCr-based alloy is employed for the magnetic particles 16, thereby making the c-axis of the CoCr alloy parallel to the substrate surface. A Cr or CrMo base layer may be formed on the carbon layer 15 inside the pores 14 prior to the formation of the magnetic particles 16, thereby controlling the orientation of the magnetic particles 16 formed thereon. In this case, the base layer is set to, for instance, 10 nm to 100 nm in thickness.

Of ferromagnetic CoCr-based alloys, the material of the magnetic particles 16 suitable as an in-plane recording medium is, for instance, a CoCrPt alloy, particularly, CoCrPtB in which B is added. Since crystal magnetic anisotropic energy is great, it is possible to increase anisotropic energy. It is possible to improve an index of thermal stability expressed by KV/kT to prevent demagnetization due to thermal fluctuation. Here, K is an anisotropy constant, V is a magnetic particle volume, k is Boltzmann's constant, and T is absolute temperature. In particular, in the magnetic recording medium according to the present invention, each adjacent two of the magnetic particles 16 are separated from each other so that discreteness is increased in terms of the interaction between the magnetic particles 16. Therefore, greater anisotropic energy results in better thermal stability.

In order to further improve thermal stability, the magnetic particles 16 may be formed of a multilayer body formed by antiferromagnetically coupling multiple ferromagnetic films by forming a non-magnetic film of Ru between the ferromagnetic films. The magnetic particles 16 may be formed of, from top (surface), for instance, a CoCrPtB ferromagnetic film (10 nm in thickness), a Ru film (0.8 nm in thickness), a CoCrPtB ferromagnetic film (5 nm in thickness), and a CrMo base layer (20 nm in thickness). The upper and lower CoCrPtB ferromagnetic films are coupled antiferromagnetically, so that V of the above-described index KV/kT can be increased without a substantial increase in the remanent magnetization of the magnetic particles 16. Accordingly, it is possible to increase thermal stability.

In order to form a perpendicular recording medium using sputtering, Ti, TiCr, C, and Pt may be employed as the lower electrode layer or the base layer of the magnetic particles 16. The c-axis of the CoCr alloy of the magnetic particles 16 can be oriented to be perpendicular to the substrate surface with good orientation. It is also possible to improve the crystallinity of the initial growth layer of the CoCr alloy. As the magnetic particles, CoCrPt, CoCrTa, CoCrPtTa, or a material formed by adding B (boron) to any of these may be employed.

Further, the magnetic particles 16 may also be composed principally of an alloy selected from a group of FePt, CoPt, and CoPd.

Next, in the case of forming the magnetic particles 16 by plating, in step S88, the surface of each magnetic particle 16 is flattened by chemical mechanical polishing (CMP). It is preferable to polish a projection at the center of the surface of each magnetic particle 16 formed by plating, employing, for instance, any of abrasives that can polish Co or a CoCr alloy, which forms the magnetic particles 16, using a double-side polishing machine. It is possible to cause the surface of the carbon layer 15 and the surface of each magnetic particle 16 to be in substantially the same plane, and it is possible to prevent the carbon layer 15 from being polished to become a thin film or be removed. Such abrasives are, for instance, diamond particles, alumina particles, and cerium oxide particles.

Next, in step S92, the lubrication layer 18 is formed by applying a lubricant on the surfaces of the magnetic particles 16 and the carbon layer 15. For instance, ZDol (manufactured by Monte Fluos; end group: —OH) or AM3001 (manufactured by Ausimonto; end group: benzene ring), which has an end group with well-known perfluoropolyether as a main chain, or Z25 (manufactured by Monte Fluos), which does not have an end group, may be employed as the lubricant. In light of the bonding of the lubrication layer 18 and the carbon layer 15, the lubricant is preferably one having a benzene ring at the end of its structure, for instance, AM3001.

As a result, the magnetic recording medium 10 shown in FIGS. 2A and 2B is formed.

According to this embodiment, the anodic alumina film 13 is coated with the carbon layer 15. Since the adhesion of the surface of the anodic alumina film 13 and the carbon layer 15 is high, corrosion resistance and durability are excellent. Further, since the magnetic particles 16 are formed isolated from each other, medium noise is prevented from increasing even in high-density recording, thus making it possible to perform high-density recording.

Figure 7:
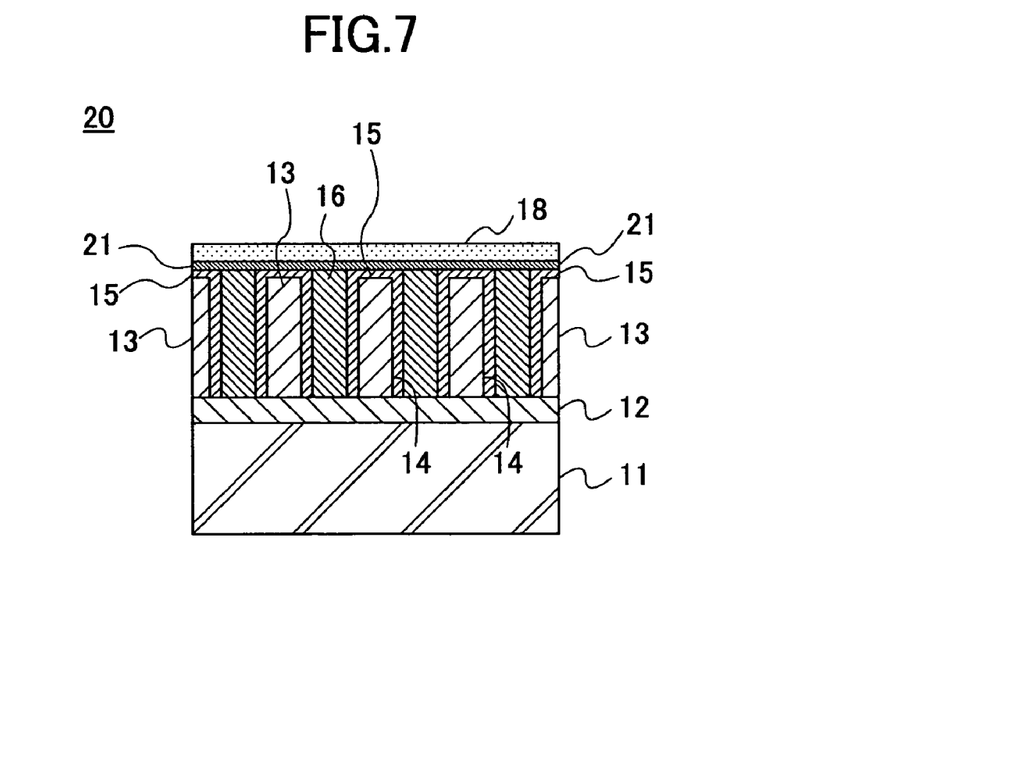
FIG. 7 is a sectional view of a magnetic recording medium according to a first variation of the first embodiment of the present invention.

Next, a description is given of a first variation of this embodiment. FIG. 7 is a sectional view of a magnetic recording medium 20 that is the first variation of this embodiment. This variation is equal to the above-described embodiment except that a protection layer 21 is formed on the magnetic particles 16 and the carbon layer 15. In the drawing, the same elements as those described above are referred to by the same numerals, and a description thereof is omitted.

Referring to FIG. 7, the magnetic recording medium 20 includes the substrate 11, the lower electrode layer 12 formed on the substrate 11, the anodic alumina film 13 formed on the lower electrode layer 12, the carbon layer 15 formed on the surface of the anodic alumina film 13 and the inner walls of the pores 14, the magnetic particles 16 formed on the carbon layer 15 inside the pores 14, the protection layer 21 formed on the surface of the carbon layer 15 and the magnetic particles 16, and the lubrication layer 18 formed on the protection layer 21.

Referring to FIG. 3, the protection layer 21 is formed (in step S90) between the planarization of the surface of each magnetic particle (step S88) and the application of the lubricant (step S92). The protection layer 21, which is formed using sputtering or CVD, is composed of amorphous carbon, hydrogenated carbon, or carbon nitride. Specifically, hydrogenated carbon, for instance, can be formed by sputtering carbon in an Ar gas atmosphere including $H_2$ gas. Further, nitrogen gas may be added. The protection layer 21 is set to 0.5 nm to 5 nm in thickness. The protection layer 21 is preferably hydrogenated carbon in light of its hardness and its bonding to a lubricant. Further, since the protection layer 21 is formed, a lubricant such as ZDol, AM3001, or Z25 as described above may be suitably employed for the lubrication layer 18 in accordance with the material of the protection layer 21.

According to this variation, the surface of each magnetic particle 16 is covered with the protection layer 21. Accordingly, the corrosion resistance of the magnetic particles 16 can be improved, and durability can be further increased.

Figure 8:
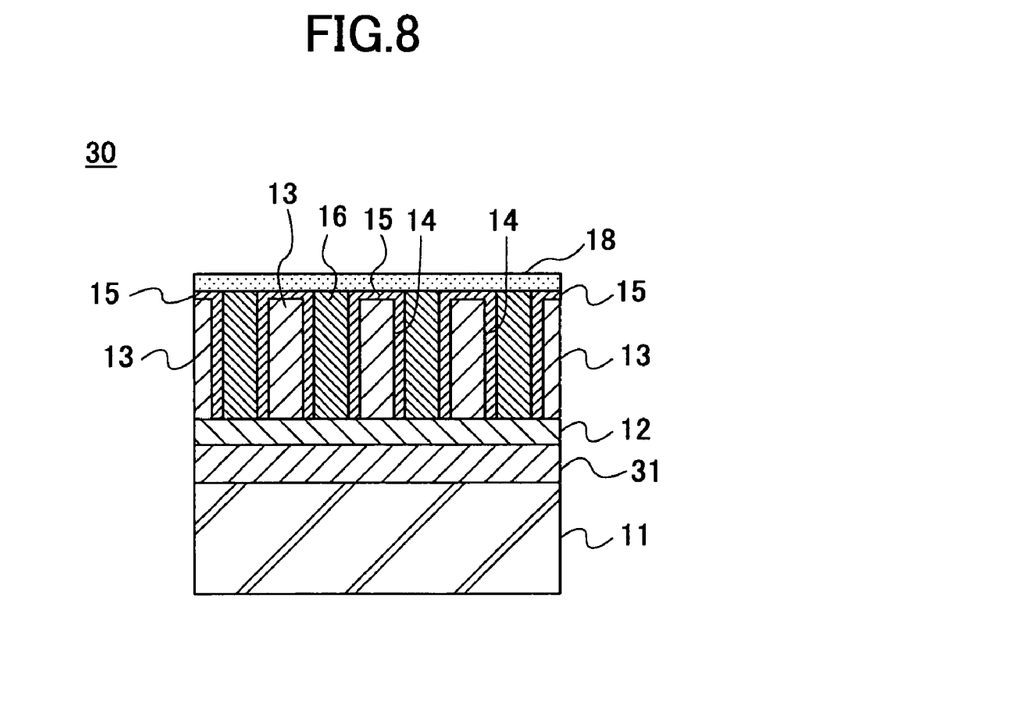
FIG. 8 is a sectional view of a magnetic recording medium according to a second variation of the first embodiment of the present invention.

Further, a description is given of a second variation of this embodiment. FIG. 8 is a sectional view of a magnetic recording medium 30 that is the second variation of this embodiment. This variation is equal to the above-described embodiment except that a soft magnetic backup layer 31 is formed on the substrate 11. Further, the magnetic particles 16 form a perpendicular magnetic recording medium in which, for instance, the c-axis of Co is oriented in a direction perpendicular to the substrate 11. In the drawing, the same elements as those described above are referred to by the same numerals, and a description thereof is omitted.

Referring to FIG. 8, the magnetic recording medium 30 includes the substrate 11, the soft magnetic backup layer 31 formed on the substrate, the lower electrode layer 12 formed on the soft magnetic backup layer, the anodic alumina film 13 formed on the lower electrode layer 12, the carbon layer 15 formed on the surface of the anodic alumina film 13 and the inner walls of the pores 14, the magnetic particles 16 formed on the carbon layer 15 inside the pores 14, and the lubrication layer 18 formed on the surface of the carbon layer 15 and the magnetic particles 16.

The soft magnetic backup layer 31, which is formed by sputtering, CVD, or plating, is composed of a soft magnetic amorphous or polycrystalline layer. Specifically, NiFe (permalloy), CoFeB, CoCrNb, or NiFeNb of 50 nm to 2 μm in thickness may be employed. By providing the soft magnetic backup layer 31, all magnetic flux from a single magnetic pole head can be absorbed by the soft magnetic backup layer 31 in the case of recording with the single magnetic pole head. In particular, greater values are preferable for the product of the saturation magnetic flux density Bs and the film thickness of the soft magnetic backup layer 31. This enables saturation recording so that it is possible to cause each magnetic particle 16 to enter the state of a single magnetic domain. Further, it is preferable that the high-frequency characteristics, such as high-frequency magnetic permeability, of the soft magnetic backup layer 31 be high. This enables recording at higher frequencies, that is, higher transfer rates.

A description is given below of implementations according to this embodiment.

[First Implementation]

A 20 nm thick tungsten film was formed as a lower electrode layer on a 2.5 inch disk-like silicon substrate by vapor deposition. Next, a 50 nm thick aluminum film was formed on the tungsten film by vapor deposition. Next, anodic oxidation was performed with voltage to be applied being set to 20 V for 30 min. using an oxalic acid solution of a concentration of 0.6 mol/L, thereby converting the aluminum film to an anodic alumina film and forming pores. An average inter-pore distance was 60 nm, and an average pore size (diameter) was 40 nm.

Next, a 5 nm thick carbon layer was formed by 10 min. of processing using the thermal decomposition CVD apparatus employing an electric furnace shown in FIG. 4, supplying nitrogen gas and propylene gas and setting temperature of substrate heating by the electric furnace to 800° C. The percentage of the amount of propylene gas was set to 2.5% of that of nitrogen gas, and the total flow rate in the quartz reaction tube was set to 200 $cm^3$ per minute.

Next, magnetic particles of a 50 nm thick Co film were formed by electroplating using a cobalt sulfate solution.

Next, the surface of the carbon layer and the cobalt film was polished by CMP until an average surface roughness Ra of 0.7 nm or less was reached. As a result, magnetic recording media in which three types of lubricants were applied respectively for a thickness of 4 nm were produced. The three types of lubricants are Z25, ZDol, and AM3001, whose main chains are perfluoropolyether and whose end groups are a non-polar group, a hydroxyl group, and a benzene ring, respectively.

[Second Implementation]

In magnetic recording media according to this implementation, an anodic alumina film was formed in the same manner as in the magnetic recording media of the first implementation.

Next, acetylene gas and hydrogen gas were supplied by the hot filament CVD apparatus shown in FIG. 5 at an acetylene gas pressure of 3 Pa, a hydrogen gas pressure of 27 Pa, and a total pressure of 30 Pa. Further, a 5 nm thick carbon layer was formed by 15 min. of processing with the temperature of the rhenium hot filaments being set to approximately 1900° C. Magnetic particles and a lubrication layer were formed in the same manner as in the first implementation.

[Third Implementation]

In magnetic recording media according to this implementation, an anodic alumina film was formed in the same manner as in the magnetic recording media of the first implementation.

Next, a 5 nm thick carbon layer was formed by 10 min. of processing using the microwave plasma CVD apparatus shown in FIG. 6, supplying methane gas and hydrogen gas at a methane gas flow rate of 40 sccm, a hydrogen gas flow rate of 60 sccm, and a total pressure of 400 Pa (3 Torr) with RF frequency being set to 2.45 GHz, RF power being set to 2 kW, and substrate heating temperature being set to 400° C. Then, magnetic particles and a lubrication layer were formed in the same manner as in the first implementation.

COMPARATIVE EXAMPLE

Magnetic recording media according to a comparative example were formed in the same manner as the magnetic recording media of the first implementation except that a carbon layer was not formed and that a 10 nm thick hydrogenated carbon layer was formed as a protection layer on magnetic particles by sputtering.

(Corrosion Resistance Evaluation)

A corrosion resistance test was conducted on the samples of the first through third implementations and the comparative example, and their corrosion resistance was evaluated. In each of the samples, a magnetic recording medium was formed up to its magnetic particles.

That is, in the samples of the first through third implementations, the carbon layer is formed to cover the anodic alumina film, while in the samples of the comparative example, no carbon layer is formed.

Corrosion resistance was evaluated by putting the samples in acid and alkali solutions of 20° C., soaking them for a predetermined period of time, and measuring the amount of aluminum dissolved in each solution. Specifically, a 0.1 mol/L HCl solution was employed as an acid, and a 0.1 mol/L NaOH solution was employed as an alkali. The amount of aluminum dissolved from the anodic alumina film in each solution was quantified by atomic absorption analysis, and was converted to the amount per one gram of the anodic alumina film.

Figure 9:
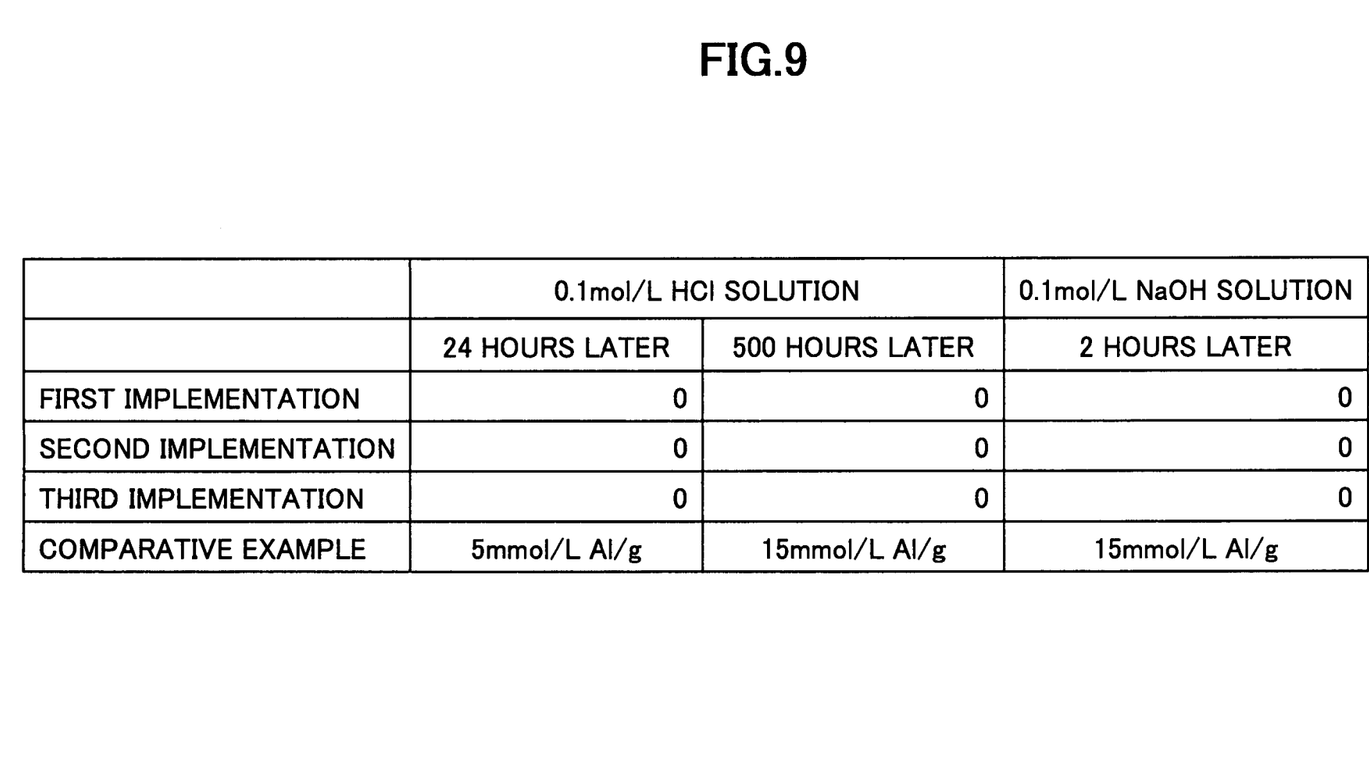
FIG. 9 is a table showing the results of a corrosion resistance test according to the first embodiment of the present invention.

FIG. 9 shows the results of the corrosion resistance test. Referring to FIG. 9, with respect to the samples of the first through third implementations, aluminum dissolved from the anodic alumina film is below or equal to a detection limit (the detection limit is below or equal to 0.01 mmol/L Al/g, which is indicated by 0 in FIG. 9), showing that aluminum is dissolved in neither the HCl solution nor the NaOH solution. On the other hand, with respect to the samples of the comparative example, aluminum is dissolved from the anodic alumina film, showing that their corrosion resistance is poor. Accordingly, the results of this evaluation show that in the samples of the first through third implementations, corrosion resistance is significantly improved by covering the anodic alumina film with the carbon layer so that the samples are excellent as magnetic recording media and magnetic medium substrates for a magnetic recording medium.

(Magnetic Head Decompression Sliding Test)

In order to evaluate the durability of the magnetic recording media of the first through third implementations and the comparative example against a magnetic head, a decompression sliding test, which is an accelerated test, was conducted.

The decompression sliding test is conducted by loading a magnetic head onto a magnetic recording medium rotating under reduced pressure to cause the magnetic head to slide, and evaluating damage caused to the surface of the magnetic recording medium. Using a pico-slider of a head weight of 5 g as a magnetic head, the test was conducted with a radius of 20 mm at 4000 RPM under a reduced pressure atmosphere of 6700 Pa (50 Torr).

Figure 10:
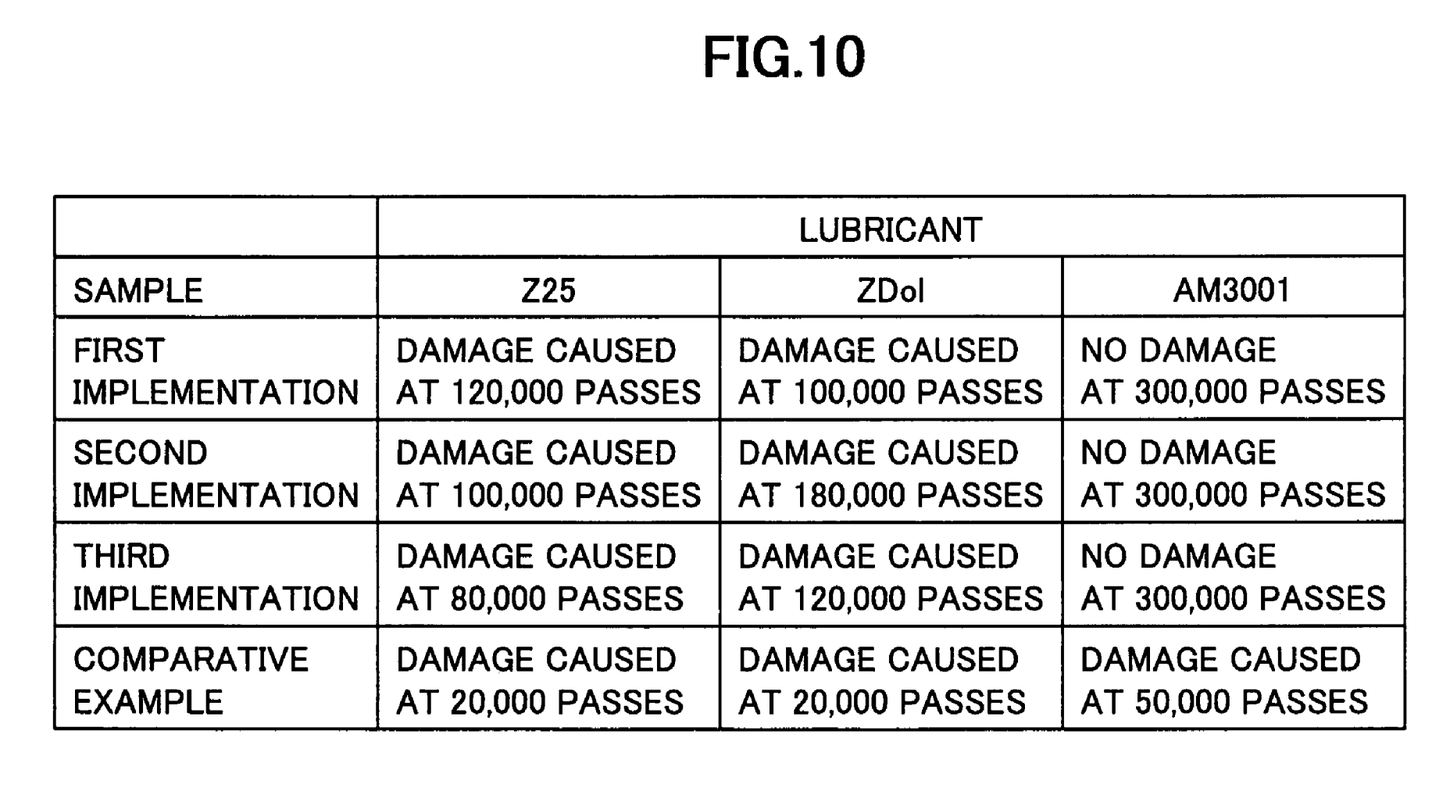
FIG. 10 is a table showing the results of a magnetic head decompression sliding test according to the first embodiment of the present invention.

FIG. 10 shows the results of the magnetic head decompression sliding test. Referring to FIG. 10, damage was caused to the magnetic recording media of the comparative example at 20,000–50,000 passes with all lubricants, while damage was not caused to the magnetic recording media of the first through third implementations at less than 80,000 passes. This shows that the magnetic recording media of the first through third implementations have better durability than the magnetic recording media of the comparative example.

Further, it is also understood that the magnetic recording media of the first through third implementations have better durability with the lubricant AM3001 than with the lubricants Z25 and ZDol. It is considered that since the end groups of AM3001 are formed by benzene rings that bond to the carbon layer of the magnetic recording medium more firmly, durability is better than in the case of employing the other lubricants.

A lubricant layer of 4 nm in thickness was formed in the magnetic recording media employed in the above-described test. The thickness of the lubricant layer was further increased so as to evaluate adhesion to the magnetic head. With respect to the magnetic recording media of the comparative example, adhesion to the magnetic head occurred at 10 nm. On the other hand, with respect to the magnetic recording media of the first through third implementations, no adhesion occurred even in those in which application was performed under the application condition of forming a thickness of 20 nm. Accordingly, it is inferred that the carbon layers of the recording medium of the first through third implementations have excellent capability to store lubricant. In a magnetic recording medium storing a large amount of lubricant, the stored lubricant is immediately supplied when a lubricant layer on the surface of the magnetic recording medium is lost by contact with a magnetic head. Therefore, it excels in durability against magnetic head sliding. Accordingly, results better than those of the magnetic head decompression sliding test shown in FIG. 10 are expected to be obtained by forming a lubricant layer of maximum thickness without the occurrence of adhesion.

Second Embodiment

Figure 11:
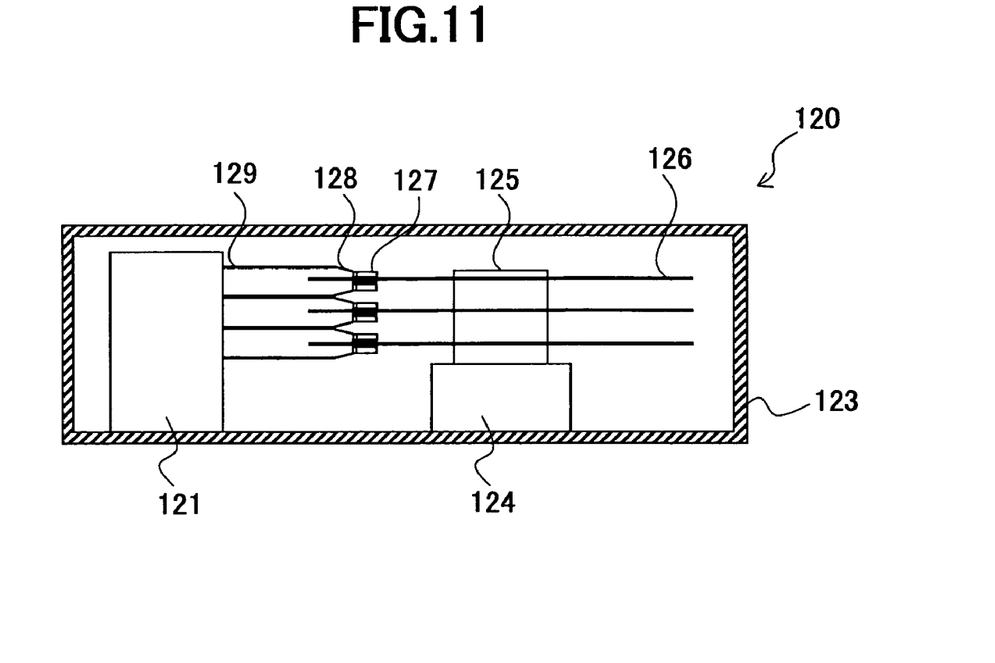
FIG. 11 is a sectional view of a magnetic storage unit according to a second embodiment of the present invention.
Figure 12:
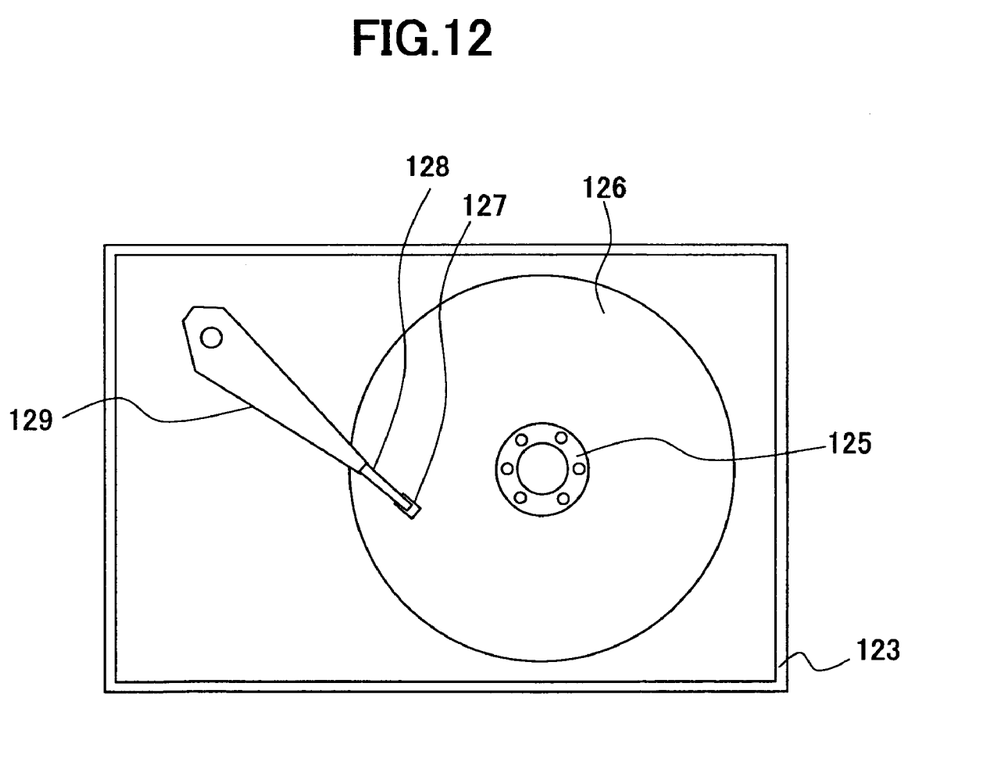
FIG. 12 is a plan view of the magnetic storage unit according to the second embodiment of the present invention.

Next, a description is given, with reference to FIGS. 11 and 12, of an embodiment of a magnetic storage unit according to the present invention. FIG. 11 is a sectional view of a magnetic storage unit 120 according to this embodiment. FIG. 12 is a plan view of the magnetic storage unit 120 shown in FIG. 11.

Referring to FIGS. 11 and 12, the magnetic storage unit 120 includes a housing 123. Inside the housing 123, a motor 124, a hub 125, multiple magnetic recording media 126, multiple recording and reproduction heads 127, multiple suspensions 128, multiple arms 129, and an actuator unit 121 are provided. The magnetic recording media 126 are attached to the hub 125 that is rotated by the motor 124. Each recording and reproduction head 127 is formed of a composite-type head of a reproduction head of an MR element (magnetoresistive element), a GMR element (giant magnetoresistive element), or a TMR element (tunnel magnetoresistive element), and a recording head of a thin film head. The recording head may be a ring-type head, or a single-pole head if the magnetic recording media 126 are perpendicular recording media. Each recording and reproduction head 127 is attached to the end of the corresponding arm 129 through the suspension 128. The arms 129 are driven by the actuator unit 121. The basic configuration itself of this magnetic storage unit 120 is well known, and a detailed description thereof is omitted in this specification.

The magnetic storage unit 120 of this embodiment is characterized by the magnetic recording media 126. The magnetic recording media 126 are, for instance, the magnetic recording media of the first embodiment having the layer configuration shown in FIG. 2B, those of the first and second variations thereof, or those of the first through third implementations. Needless to say, the number of magnetic recording media 126 is not limited to three, and may be one, two, or more than three.

The basic configuration of the magnetic storage unit 120 is not limited to the one shown in FIGS. 11 and 12. The magnetic recording media 126 employed in the present invention are not limited to magnetic disks.

According to this embodiment, the magnetic storage unit 120 has long-term operational reliability because the magnetic recording media 126 have good corrosion resistance and durability. Further, since the magnetic particles of the magnetic recording media 126 are formed isolated, medium noise is low and signal-to-noise ratio is high. Accordingly, it is possible to support high-density recording.

Thus, the preferred embodiments of the present invention are described in detail above. The present invention is not limited to the specifically disclosed embodiments, and variations and modifications may be made without departing from the scope of the present invention. For instance, the present invention is applicable to a magnetic tape employed as an auxiliary storage device for a large-scale computer. Further, the above-described embodiments and the first and second variations may be combined with each other.

According to the present invention, by covering the upper surface of an anodic alumina film and the inner walls of pores with a carbon layer composed primarily of six-membered rings and five-membered rings, it is possible to provide a magnetic recording medium that satisfies both corrosion resistance and durability and enables high-density recording, a method of manufacturing the same, a magnetic medium substrate employed in the magnetic recording medium, and a magnetic storage unit.

What is claimed is:

1. A magnetic recording medium, comprising:
   a substrate;
   an anodic alumina film formed on the substrate;
   a pore formed in the anodic alumina film;
   a carbon layer covering a surface of the anodic alumina film and an inner wall of the pore;
   a magnetic particle formed on the carbon layer inside the pore; and
   a lubrication layer covering the carbon layer and the magnetic particle.

2. The magnetic recording medium as claimed in claim 1, further comprising:
   a base electrode layer between the substrate and the anodic alumina film.

3. The magnetic recording medium as claimed in claim 1, wherein the carbon layer comprises a six-membered ring and a five-membered ring as principal components.

4. The magnetic recording medium as claimed in claim 1, wherein the carbon layer comprises a cylindrical structure inside the pore.

5. The magnetic recording medium as claimed in claim 1, wherein the lubrication layer comprises a material having perfluoropolyether as a principal chain thereof.

6. The magnetic recording medium as claimed in claim 5, wherein the lubrication layer comprises a material having a benzene ring as an end group thereof.

7. The magnetic recording medium as claimed in claim 1, further comprising:
   a protection layer of hydrogenated carbon on the magnetic particle and the carbon layer.

8. The magnetic recording medium as claimed in claim 1, wherein the magnetic particle has perpendicular anisotropy.

9. The magnetic recording medium as claimed in claim 8, further comprising:
   a soft magnetic layer between the substrate and the anodic alumina film.

10. The magnetic recording medium as claimed in claim 1, wherein the magnetic particle principally comprises an alloy selected from a group of FePt, CoPt, and CoPd.

11. A magnetic medium substrate, comprising:
    a substrate in a magnetic recording medium;
    an anodic alumina film formed on the substrate;
    a pore formed in the anodic alumina film; and
    a carbon layer covering a surface of the anodic alumina film and an inner wall of the pore.

12. A magnetic storage unit, comprising:
    a magnetic head including a magnetoresistive reproduction head; and
    a magnetic recording medium as set forth in claim 1.

* * * * *